United States Statutory Invention Registration [19]

[11] Reg. Number: H439

Rehn et al.

[43] Published: Mar. 1, 1988

[54] ULTRAHIGH VACUUM MOUNTING

[75] Inventors: Victor L. Rehn, Ridgecrest; Peter J. Love, Santa Barbara, both of Calif.

[73] Assignee: The United States of America as represented by the Secretary of the Navy, Washington, D.C.

[21] Appl. No.: 870,218

[22] Filed: Jun. 2, 1986

[51] Int. Cl.[4] ..... F16L 19/08

[52] U.S. Cl. ..... 285/328; 285/329; 285/173; 285/422; 285/917; 374/208; 73/866.5

[58] Field of Search ..... 285/328, 329, 917, 905, 285/173, 368, 422, 904, 378, 13; 34/242, 92; 73/866.5, 52; 220/1 B, 2.2, 2.3 R, 85 SP; 374/208, 209, 148, 194

[56] References Cited

U.S. PATENT DOCUMENTS

| | | | |
|---|---|---|---|
| 545,928 | 9/1895 | Whitmore | 285/422 |
| 757,376 | 4/1904 | Whitaker | 285/328 |
| 1,834,581 | 12/1931 | Ferrell et al. | 285/328 |
| 1,906,826 | 5/1933 | Smith et al. | 285/354 |
| 2,050,137 | 8/1936 | Walsh | 285/917 |
| 2,282,552 | 5/1942 | Banowetz | 285/331 |
| 2,330,841 | 10/1943 | Parker | 285/328 |
| 2,514,976 | 7/1950 | Stivin | 285/139 |
| 2,604,507 | 7/1952 | Tyson | 174/35 |
| 2,641,381 | 6/1953 | Bertrand | 285/422 |
| 3,009,258 | 11/1961 | Taylor | 34/92 |
| 3,144,035 | 8/1964 | Hablanian et al. | 137/1 |
| 3,194,591 | 7/1965 | Weisend | 285/422 |
| 3,211,478 | 10/1965 | Batzer | 285/363 |
| 3,301,578 | 1/1967 | Platt et al. | 285/336 |
| 3,871,107 | 3/1975 | Broadwin | 34/92 |
| 3,908,977 | 9/1975 | Roepke et al. | 403/290 |
| 3,950,963 | 4/1976 | Sutherland | 34/92 |
| 3,989,285 | 4/1976 | Yancey | 285/917 |
| 4,281,841 | 8/1981 | Kim et al. | 285/381 |
| 4,283,079 | 8/1981 | Flaherty | 285/381 |
| 4,427,378 | 1/1984 | Bowers | 432/242 |

FOREIGN PATENT DOCUMENTS

| | | | |
|---|---|---|---|
| 129992 | 1/1985 | European Pat. Off. | 285/328 |
| 1046426 | 12/1958 | Fed. Rep. of Germany | 285/422 |
| 1800856 | 5/1970 | Fed. Rep. of Germany | 285/329 |
| 2250070 | 4/1974 | Fed. Rep. of Germany | 285/328 |
| 318212 | 1/1902 | France | 285/328 |
| 224740 | 11/1924 | United Kingdom | 285/328 |
| 397603 | 8/1933 | United Kingdom | 285/917 |
| 2038972 | 7/1980 | United Kingdom | 285/328 |

*Primary Examiner*—Harold J. Tudor

*Attorney, Agent, or Firm*—William C. Townsend; W. Thom Skeer; Stephen J. Church

[57] ABSTRACT

A mounting for an object processed at a predetermined temperature in an ultrahigh vacuum chamber having a stainless steel wall. The mounting has a stainless steel tube welded to the wall and opening through it and has an oxygen-free-high-conductivity copper finger extended from the tube to receive the object. At the junction of the tube and the finger, the tube bears an annular knife edge which engages a flat surface of the finger, and an ultrahigh vacuum seal is established by a collar and bolt coupling which draws the finger against the knife edge. The temperature of the finger and the object are then controlled and measured by cryogenic liquids, electrical heaters, and sensors inserted through the tube into contact with the finger.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 1
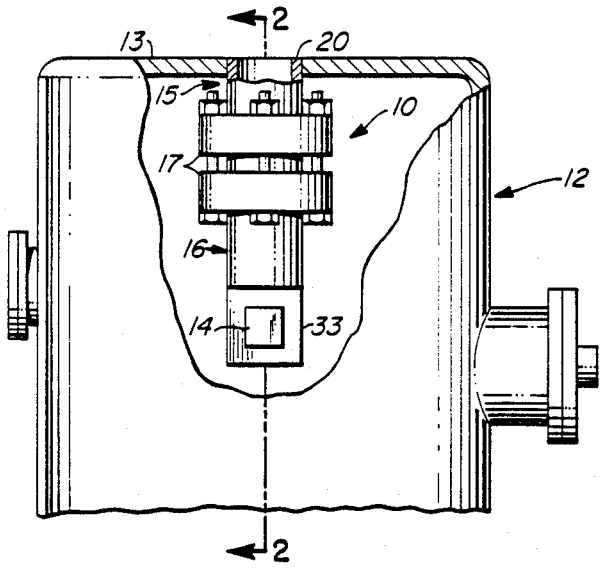
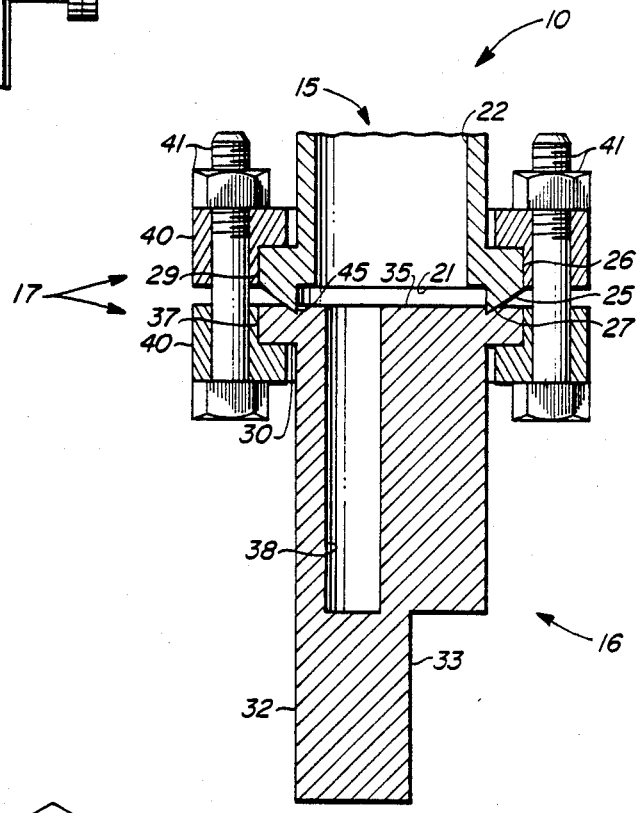
Fig. 2
Fig. 3
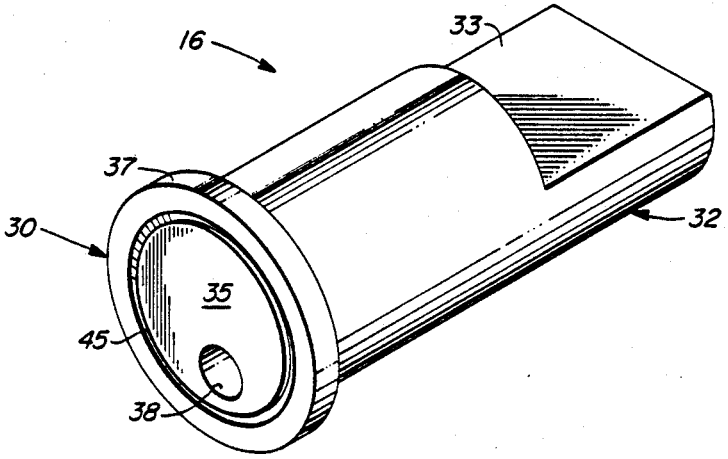

ULTRAHIGH VACUUM MOUNTING

BACKGROUND OF THE INVENTION

1. Field of the Invention

This invention pertains to the field of pipe joints or couplings. More particularly, this invention pertains to a flange coupling for diverse metal elements.

2. Description of the Prior Art

A process requiring an ultrahigh vacuum (UHV), a vacuum in the order of less than $10^{-9}$ Torr or approximately $10^{-12}$ atmosphere, is typically performed in a chamber having a stainless steel wall with the object being processed mounted on a "finger" or inward projection from the wall. Typically, the temperature of the object must be precisely controlled and measured, so that it is highly desirable to mount the object on an element of oxygen-free-high-conductivity (OFHC) copper which has high thermal conductivity and does not affect the UHV process. It is also desirable that a substantial portion of the OFHC copper element be directly accessible from the chamber exterior for direct connection of temperature maintaining and measurement materials and devices to the element from the chamber exterior.

Prior art arrangements for connections through a UHV chamber wall and for cold or hot fingers in lower vacuum processes do not provide a solution to the apparently simple need to connect an exteriorly accessible copper finger to a stainless steel UHV chamber wall for several reasons. First, copper cannot be welded to stainless steel. Second, brazing cannot be used since the brazing material leaks and out gasses excessively for UHV conditions. For similar reasons, gaskets, sealing greases, and the like effective at a lower vacuum are not practical at UHV conditions. Third, the finger must be readily and economically removeable and replaceable in the event it cannot be reused, becomes contaminated, or requires reconfiguration for a different process or object. Fourth, the presence of a leakproof layer, even of metal, between the finger and the chamber exterior results in an undesirable decrease in thermal conductivity therebetween.

A well known UHV flange connector for a pair of stainless steel elements uses a soft copper ring oppositely engaged by annular knife edges individually borne by the stainless steel elements, these elements having flanges adjacent to the knife edges and engaged by stainless steel rings through which extend bolts for drawing the knife edges into UHV sealing relation with the copper ring. This UHV connector is advantageous because the copper ring may be reused by machining its opposite faces to remove the indentations caused by the knife edges and because the stainless steel elements may be welded to a stainless steel UHV chamber wall. However, this connector does not provide a solution to the problem of connecting a dissimilar metal finger to such a stainless steel wall since the connected knife edged elements are themselves stainless steel and since substitution of OHFC copper, which is relatively soft, would result in a knife edge too soft for use with the copper ring.

SUMMARY OF THE INVENTION

The subject invention is characterized by the use, with a stainless steel, knife edged UHV connecting element, of a copper element which mates with the stainless steel element and which serves both as a copper ring engaged by the knife edge of the connecting stainless steel element and as a finger for mounting an object whose temperature is to be controlled while the object is within a UHV environment.

OBJECTS OF THE INVENTION

It is an object of the subject invention to provide a mounting, which projects inwardly into UHV chamber, for a object whose temperature is to be controlled during a process therein.

A more specific object is to provide such a mounting, for use with a stainless steel UHV wall, to mount the object on a copper element accessible exteriorly of the chamber.

Another object is to provide such a mounting wherein the copper element is easily replaced, reconfigured, or repaired.

Another object is to provide such a mounting which does not adversly affect either the vacuum within the chamber or the process therein.

A further object is to provide such a mounting conveniently useable with readily available UHV fittings and normal UHV techniques.

BRIEF DESCRIPTION OF THE DRAWINGS

Other objects, advantages, and novel features of the subject invention will become apparent from the following detailed description thereof when considered with the accompanying drawing in which:

FIG. 1 shows an ultrahigh vacuum mounting of the present invention in an exemplary operating environment;

FIG. 2 is a section of the mounting taken from the position of line 2—2 of FIG. 1; and FIG. 3 is an isometric view of a representative finger used in the mounting.

DESCRIPTION OF THE PREFERRED EMBODIMENT

FIG. 1 shows an ultrahigh vacuum mounting 10, which embodies the subject invention, with a generalized and fragmentarily represented ultrahigh vacuum (UHV) chamber 12 having a stainless steel wall 13 from which mounting 10 extends inwardly to receive a generalized object 14 for processing at a predetermined temperature in a UHV environment.

Mounting 10 includes a first member or cylindrical tube 15 which is unitarily constructed of stainless steel and, therefore, weldable to wall 13. Tube 15 is preferably constructed of type 304 stainless steel. Mounting 10 includes a second member or generally cylindrical finger 16 which is extended coaxially from tube 15 and is unitarily constructed of oxygen-free-high-conductivity copper, a material relatively softer than stainless steel and preferably having a Rockwell F hardness between 50 and 80. Mounting 10 also includes a coupling 17 which, in addition to functions subsequently described, detachably connects finger 16 to tube 15 and thus serves to retain finger 16 on wall 13 and to release the finger therefrom.

As seen in FIGS. 1 and 2, tube 15 has a first side or open axial end 20 and an opposite second side or open axial end 21 and defines an opening 22 extending axially through the tube between ends 20 and 21. End 20 is permanently connected in ultrahigh vacuum sealing relation to wall 13, preferably by inert gas welding. Tube 15 has an annular ridge 25 which circumscribes opening 22 at tube end 21. Ridge 25 has a base 26 and extends therefrom axially of tube 15 terminating in an annular knife edge 27 so that edge 27 is disposed oppositely of base 26 from the balance of tube 15. Knife edge 27 lies in a plane which is normal to the axis of tube 15 and is thus transversely related to this tube. Since ridge 25 is unitarily constructed with such balance, base 26 is connected thereto in ultrahigh vacuum sealing relation, and ridge 25 is relatively harder than finger 16. Tube 15 has an annular flange 29 which circumscribes the tube at its end 21.

Finger 16, as seen in FIGS. 1–3, has a connecting portion 30, which is juxtapositioned to side 21 of tube 15, and has a receiving portion 32 which is extended from side 21 axially of finger 16 and within chamber 12 and is configured, as by having a step 33, to receive object 14. Object 14 is connected to finger 16 in any suitable manner, not shown, providing effective heat transfer therebetween. Finger 16 terminates adjacently to tube 15 in a planar axial end or sealing surface 35 which engages knife edge 27. It can be seen from FIG. 2 that finger 16 closes opening 22 of tube 15. Since finger 16 is unitarily constructed, surface 35 is connected in ultrahigh vacuum sealing relation to the balance of finger 16 and is relatively softer than ridge 25. Finger 16 has an annular flange 37 which circumscribes surface 35 and extends therefrom axially of finger 16 and oppositely from knife edge 27. Typically, finger 16 has a cylindrical well 38 extended axially, but not necessarily coaxially, into the finger from surface 35. Coupling 17 is of a configuration well known in UHV work and includes a pair of substantially identical collars 40 which are counterbored to receive flanges 29 and 37. Coupling 17 thus engages finger 16 at flange 37 thereof. Collars 40 have a plurality of axially aligned bores through which extend individually bolt and nut assemblies 41 for urging collars 40 axially together without relative movement rotationally or radially therebetween and thereby drawing tube 15 and finger 16 together and forcing knife edge 27 into surface 35 so that the knife edge is impressed therein in ultrahigh vacuum sealing relation. The resulting annular indentation is indicated by numeral 45 in FIGS. 2 and 3 and, preferably, has a depth of 0.010 to 0.015 inch (0.25 to 0.38 mm.).

MODE OF OPERATION

The operation of the described embodiment of the subject invention is believed clearly apparent and will be discussed briefly. After tube 15 is connected to wall 13, fingers similar to finger 16 but having other configurations of receiving portions 32 may be interchangeably installed on tube 15 in UHV sealing relation to the tube and wall 13 for a variety of objects, such as 14, to be subjected to controlled or measured temperatures under UHV conditions. After coupling 17 is used to provide UHV seal between tube 15 and finger 16 and a desired vacuum established in chamber 12, the temperature of the object may be controlled at a relatively low temperature by filling tube 15 with a cryogenic liquid or at a relatively higher temperature by inserting an electric heater through opening 22 into well 38, the temperature being measured by any suitable sensor engaged with finger surface 35 or inserted into a well such as well 38.

It is evident that mounting 10 provides a high thermal conductivity element, finger 16, accessible through opening 22 from the exterior of a stainless steel UHV chamber without an adverse effect on the vacuum therein. It is also evident that finger 16 can be easily disconnected from chamber 12 to replace the finger or to reconfigure it for other objects, such as 14, whose temperature is to be controlled or measured in a variety of ways. A finger 16 can be reused by machining surface 35 to remove indentation 45 from a prior use. It is apparent from FIG. 3 that surface 35 is readily accessible in a direction radially thereof for such machining.

Many modifications and variations of the subject invention are possible in the light of the above teachings, and it is to be understood, therefore, that the invention may be practiced within the scope of the following claims other than as specifically set forth above.

What is claimed is:

1. A mounting for an object which is to have a predetermined temperature while in an ultrahigh vacuum environment, the mounting being inwardly extendable from a wall of an ultrahigh vacuum chamber and comprising:

a cylindrical tube unitarily constructed of relatively hard material, the tube having one axial end for connection to said wall and having an opposite axial end bearing an annular knife edge unitarily constructed with the tube and circumscribing an opening which extends axially through the tube;

a generally cylindrical finger unitarily constructed of relatively soft material and having an axial end surface and a receiving portion, the finger selectively being detachable from the tube and being attachable thereto so as to extend coaxially from the tube with the receiving portion extended axially of the finger from the knife edge, the finger closing the opening and being accessible through the opening and the end surface being accessible in a direction radially of the end surface when the finger is detached from the tube;

coupling means for detachably connecting the finger to the tube and for urging the finger axially toward the tube without relative movement rotationally or radially therebetween to force the knife edge into ultrahigh vacuum sealing relation with said end surface.

2. The mounting of claim 1 wherein said finger is oxygen-free-high-conductivity copper.

3. The mounting of claim 1 wherein the unitarily constructed finger of relatively soft material includes an annular flange circumscribing said axial end surface and adjacent thereto axially of the finger, and wherein said coupling means engages the finger at the flange.

* * * * *